Patented Mar. 21, 1933

1,902,070

UNITED STATES PATENT OFFICE

PAUL HALBIG AND FELIX KAUFLER, OF MUNICH, GERMANY, ASSIGNORS TO DR. ALEXANDER WACKER GESELLSCHAFT FUR ELEKTROCHEMISCHE INDUSTRIE, OF MUNICH, GERMANY, A CORPORATION

ALKOXYALDEHYDE AND PRODUCTION OF SAME

No Drawing. Application filed June 26, 1930, Serial No. 464,114, and in Germany July 27, 1929.

This invention relates to alkoxyaldehydes and the process for the production of same.

It is known that unsaturated aldehydes react with alcohols as expressed in the following equation, 3 molecules of the alcohol reacting with one molecule of the aldehyde to form an alkoxyacetal:

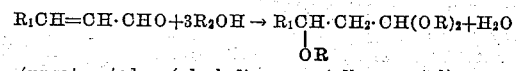

(unsaturated aldehyde)    (alcohol)    (alkoxyacetal)

wherein $R_1$ represents H or an alkyl radical and R represents an alkyl or aryl radical. For the first time it has been established that this action is reversible and the alkoxyacetal can be resolved into its component parts by aqueous acid solutions.

The present invention resides in the unexpected discovery that under suitable conditions these alkoxyacetals can be partially hydrolyzed to form the heretofore unknown alkoxyaldehydes having the formula

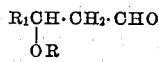

wherein $R_1$ represents H or an alkyl radical and R represents an alkyl or aryl radical.

For example, if ethoxybutylacetal is agitated with an excess of a normal acid solution at 40° C., 11.5% of crotonaldehyde, from which it is formed, is reformed after two hours, at 60°, 45% is reformed after the same time and at 80° after an hour the reformation of crotonaldehyde is practically complete. On the other hand at 25° even after 14 hours of agitation, only a trace of crotonaldehyde is present while the acetal group has been quantitatively hydrolyzed to the aldehyde group forming ethoxybutylaldehyde, a compound heretofore unknown.

Accordingly, the present invention comprises the new compound having the formula

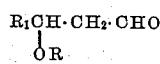

wherein $R_1$ represents H or an alkyl radical and R represents an alkyl or aryl radical and the process for the production of this compound.

The catalyst for the hydrolysis should be of an acid nature and the following may be mentioned among those which have been found suitable for this purpose: hydrochloric, sulphuric, alkylsulphuric, tolylsulfonic, phosphoric, and oxalic acids. A temperature of 20–25° C. is suitable for the hydrolysis and by maintaining this temperature the alkoxyaldehyde may remain in the reaction mixture for long periods of time without decomposing. Also, if a quick separation of alkoxyaldehyde from the reaction mixture is provided for, higher temperatures can be used. For example, the aldehyde can be separated from the reaction mixture immediately after its formation by means of steam without even neutralizing the acid catalyst. Under these conditions the conversion of the alkoxyacetal to the alkoxyaldehyde is substantially quantitative.

It is not necessary to isolate the acetal before forming the alkoxyaldehyde. An alcohol and an unsaturated aldehyde may be reacted in the presence of an acid catalyst thereby forming a mixture of alkoxyacetal and alkoxyaldehyde, and the conversion of the alkoxyacetal may then be completed to alkoxyaldehyde by diluting the mixture with water where the catalyst does not decompose the particular aldehyde being formed. The alkoxyaldehyde thus formed may be isolated by fractional distillation, with or without steam, a binary mixture of water with the product being first obtained from which the alkoxyaldehyde can be separated by a second distillation.

These alkoxyaldehydes have many uses in the synthesis of organic compounds.

The following examples are given to illustrate the method of preparation of these compounds, but it is to be understood that these examples are only illustrative and that the invention is not restricted to same.

*Example 1.*—190 grams of ethoxybutylacetal is agitated with 200 cc. of N hydrochloric acid solution for two hours at room temperature. The mixture which originally tended to separate into two layers becomes homogeneous. At this point the reaction mixture is neutralized with sodium bicarbonate or other alkaline agent and then fractionally distilled. Alcohol comes over first and then follows a binary mixture of ethoxyaldehyde and water at about 92° C. This fraction separates itself above 50° in two layers and the aldehyde is obtained free from water by a second distillation. The yield of aldehyde is approximately quantitative.

The ethoxybutylaldehyde is a colorless, pungent liquid having a density of $d_4 20°C.=0.8970$, a boiling point of 137–138° C. at 720 mm., and a boiling point of 40° C. at 12 mm. It is soluble in water, more readily soluble in cold water than in warm.

*Example 2.*—500 grams of crotonaldehyde are added to 1000 grams of ethylalcohol containing 25 grams of concentrated sulphuric acid; this mixture is allowed to stand for three days at 30° C. At the end of this period it will contain 130 grams of crotonaldehyde, 580 grams of ethoxy butylacetal, 260 grams of ethoxybutylaldehyde. 1200 grams of water are agitated with this solution, gradually going into solution. The solution is now allowed to stand for two hours at room temperature, at the end of which period the acetal will be substantially completely hydrolyzed into the corresponding aldehyde.

The solution is neutralized with magnesium carbonate and a fraction between 80–90° is distilled off leaving a residual liquor containing only water, magnesium sulphate, and a little resin-like product. The distillate is further fractionated to obtain a mixture of alcohol and water, the unused alcohol being recovered in this manner depending on the efficiency of the fractionating apparatus in a strength of 90–95%, and a second fraction containing unconverted crotonaldehyde, ethoxylbutyladehyde and water obtained. This second fraction is again fractionated to separate the ethoxybutylaldehyde.

The total conversion of crotonaldehyde to ethoxyaldehyde runs over 70% while the yield is about 90% based on the total crotonaldehyde used minus the crotonaldehyde recovered.

*Example 3.*—500 grams of crotonaldehyde are added to 1000 grams of ethyl alcohol containing 25 grams of tolylsulfonic acid dissolved therein, and this reaction mixture is allowed to stand for 5 days at room temperature. 1200 grams of water are then added to the solution and gradually dissolved therein upon agitation. The resulting solution is allowed to stand for several hours and then neutralized with sodium carbonate and recovery of ethoxybutylaldehyde carried out as in Example 2. Conversion of crotonaldehyde to ethoxybutylaldehyde and yield of ethoxybutylaldehyde based on the total crotonaldehyde used minus the crotonaldehyde recovered are approximately the same as in Example 2.

*Example 4.*—140 grams of crotonaldehyde are added to 192 grams of methyl alcohol containing 7 grams of concentrated sulphuric acid and the resulting solution is allowed to stand at room temperature for 4 days. 200 grams of water are then added to the reaction mixture which is allowed to stand for several hours. The methoxybutylaldehyde thus formed is isolated as described under Example 2.

*Example 5.*—500 grams of crotonaldehyde are added to 1000 grams of ethyl alcohol having 25 grams of concentrated sulphuric acid dissolved therein. This mixture is allowed to stand for 3 days at about 30° C. The reaction mixture is then introduced gradually into a fractionating column and steam passed through the apparatus. A mixture of ethoxybutylaldehyde, crotonaldehyde, ethyl alcohol and water distils off at about 90° C. while the dilute sulphuric acid remains in the still. Separation of the ethoxybutylaldehyde is carried out through fractional distillation as in Example 2.

In a similar manner the butyl, amyl, propyl, benzyl and other alkyl and aryl derivatives of the oxybutylaldehydes may be formed. Instead of using crotonaldehyde, acrolein or other unsaturated aldehydes may be used in this process thereby forming, instead of the alkoxybutylaldehydes the saturated alkoxyaldehydes corresponding to the unsaturated aldehydes used.

The amount of water present during the hydrolysis of the acetal group to the aldehyde group may vary widely but it is preferred that the amount of water present should be between 50% and 500% by weight of the acetal. Likewise the amount of acid catalyst present may also vary considerably but it is preferred that it should be between 2% to 30% by weight of the acetal.

The invention claimed is:

1. A new compound having the formula:

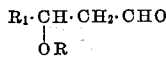

wherein $R_1$ represents H or an alkyl radical and R represents an alkyl radical.

2. A new compound having the formula:

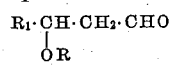

wherein $R_1$ represents H or an alkyl radical and R represents an alkyl radical having one to five carbon atoms.

3. A new compound having the formula:

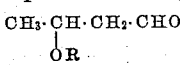

wherein R represents an alkyl radical.

4. A new compound having the formula:

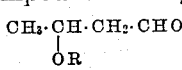

wherein R represents an alkyl radical having one to five carbon atoms.

5. A new compound having the formula:

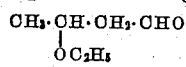

and being a colorless liquid having a boiling point of 137–138° C. at 720 mm.

6. Process for the production of alkoxyaldehydes comprising treating an alkoxyacetal with an acid hydrolyst in the presence of water at about 20–25° C.

7. Process for the production of alkoxyaldehydes comprising treating an alkoxyacetal with a catalyst selected from the group consisting of hydrochloric, sulphuric, alkyl sulphuric, tolyl sulfonic, phosphoric, and oxalic acids, in the presence of water at about 20–25° C. for several hours.

8. Process for the production of alkoxyaldehydes comprising treating an alkoxyacetal with an acid hydrolyst in the presence of a substantial amount of water at about 20–25° C. for approximately two hours, neutralizing the mixture with an alkaline agent and separating the alkoxyaldehyde formed by fractional distillation.

9. Process for the production of alkoxybutylaldehydes comprising treating an alkoxybutylacetal with a catalyst selected from the group consisting of hydrochloric, sulphuric, alkyl sulphuric, tolyl sulfonic, phosphoric, and oxalic acids, in the presence of a substantial amount of water at about 20–25° C. for approximately two hours, neutralizing the mixture with an alkaline agent and separating the alkoxybutylaldehyde formed by fractional distillation.

10. Process for the production of alkoxyaldehydes which comprises reacting a monohydroxy alcohol and an unsaturated aldehyde in the presence of an acid hydrolyst at about 30° C. for a period of several days and then adding water to the reaction mixture.

11. Process for the production of alkoxyaldehydes which comprises reacting a monohydroxy alcohol and an unsaturated aldehyde in the presence of an acid hydrolyst at about 30° C. for a period of several days, adding a substantial amount of water to the reaction mixture and maintaining a temperature of about 20–25° C., and then separating the alkoxyaldehyde formed by fractional distillation.

12. Process for the production of alkoxyaldehydes which comprises reacting a monohydroxy alcohol and an unsaturated aldehyde in the presence of a catalyst selected from the group consisting of hydrochloric, sulphuric, alkyl sulphuric, tolyl sulfonic, phosphoric, and oxalic acids, at about 30° C. for a period of several days, adding a substantial amount of water to the reaction mixture and maintaining a temperature of about 20–25° C. for several hours, and then separating the alkoxyaldehyde formed from the reaction mixture.

13. Process for the production of alkoxybutylaldehydes which comprises reacting a monohydroxy alcohol and crotonaldehyde in the presence of an acid hydrolyst at about 30° C. for a period of several days, adding a substantial amount of water to the reaction mixture and maintaining a temperature of about 20–25° C. for several hours, and then separating the alkoxybutylaldehyde formed from the reaction mixture.

14. Process for the production of ethoxybutylaldehyde which comprises reacting ethyl alcohol and crotonaldehyde in the presence of a catalyst selected from the group consisting of hydrochloric, sulphuric, alkyl sulphuric, tolyl sulfonic, phosphoric, and oxalic acids, at about 30° C. for a period of several days, adding a substantial amount of water to the reaction mixture and maintaining a temperature of about 20–25° C. for several hours, and then separating the ethoxybutylaldehyde formed from the reaction mixture.

15. Process for the production of alkoxyaldehydes comprising treating an alkoxyacetal with an acid catalyst and passing steam through the reaction mixture to separate the alkoxyaldehyde formed therefrom.

16. Process for the production of alkoxybutylaldehydes comprising treating an alkoxybutylaldehydacetal with a catalyst selected from the group consisting of hydrochloric, sulphuric, alkyl sulphuric, tolyl sulfonic, phosphoric, and oxalic acids, and passing steam through the reaction mixture to the alkoxybutylaldehyde formed therefrom.

17. Process for the production of alkoxyaldehydes which comprises reacting a monohydroxy alcohol and an unsaturated aldehyde in the presence of an acid hydrolyst at about 30° C. for a period of several days and then passing steam through the reaction mixture to separate the alkoxyaldehyde formed therefrom.

18. Process for the production of alkoxybutylaldehydes which comprises reacting crotonaldehyde and monohydroxy alcohol in the presence of an acid hydrolyst for about three days at 30° C., and then passing steam through the reaction mixture to separate the alkoxybutylaldehyde formed therefrom.

Signed at Munich, State of Bavaria, this 14th day of June A. D. 1930.

PAUL HALBIG.
FELIX KAUFLER.